United States Patent [19]

DePeaux et al.

[11] Patent Number: 5,054,381
[45] Date of Patent: Oct. 8, 1991

[54] METHOD FOR CONTRIVING AN INSERT IN A RECEPTACLE, MEANS FOR PERFORMING THE METHOD, AND RECEPTACLES PROVIDED WITH SUCH MEANS

[76] Inventors: Pierre DePeaux; Marie F. DePeaux, both of 59 rue les Eaux Ouies, Cuigy en Bray, 60850 Saint Germer de Fly, France

[21] Appl. No.: 510,265

[22] Filed: Apr. 19, 1990

[30] Foreign Application Priority Data

Apr. 21, 1989 [FR] France ............................. 89 05837

[51] Int. Cl.$^5$ ............................................. C12F 1/00
[52] U.S. Cl. .................................. 99/277.1; 144/344; 217/3 CB
[58] Field of Search ......................... 144/344; 99/277.1; 217/3 CB; 427/307, 314, 434.2

[56] References Cited

U.S. PATENT DOCUMENTS 2,135,622 5/1935 Nagle .
2,289,245 7/1940 Dant .
3,021,780 5/1960 Bobbe .

FOREIGN PATENT DOCUMENTS 2504498 10/1982 France .

Primary Examiner—W. Donald Bray
Attorney, Agent, or Firm—Kerkam, Stowell, Kondracki & Clarke

[57] ABSTRACT

A method and receptacle assembly for allowing liquids to contact wood for the treatment of wines, juices, or other liquids use an insert structure having a plurality of flat wooden elements which are wedged between opposing pairs of seats within a receptacle which may be made of stainless steel or plastic. The wooden elements which, more specifically, may be planks, are inserted in a small opening and secured within the receptacle to, effectively, form a wooden structure larger than the opening would accommodate. An elastic device may be used to help hold the wooden elements in place.

11 Claims, 2 Drawing Sheets

METHOD FOR CONTRIVING AN INSERT IN A RECEPTACLE, MEANS FOR PERFORMING THE METHOD, AND RECEPTACLES PROVIDED WITH SUCH MEANS

FIELD OF THE INVENTION

The invention relates to a method for contriving an insert, including substantially flat elongated elements, in a receptacle.

The invention also relates to the means for performing the method and to receptacles provided with these means.

More particularly but not exclusively, the invention relates to contriving an insert including wooden slats, and in particular oak or chestnut slats, in receptacles for storing liquids such as grape juice.

BACKGROUND OF THE INVENTION

Vinification, or converting grape juice into wine, is known to include multiple steps, in the course of some of which the grape juice is left to stand in receptacles for a certain period of time in order to obtain various effects.

Among the beneficial effects expected can be listed the enrichment of the juice above all with tannin, but also in aroma, as a consequence of changes that occur between the juice and the entire receptacle, when the receptacle is wooden, and in particular when it is made of oak or chestnut.

This enrichment generally improves the wine to be made.

Naturally this phenomenon of exchange with the wooden wall is exploited for making beverages other than wine; among them, whiskey, liqueurs, and so forth can be named.

Wooden receptacles are increasingly expensive, and they entail major problems in terms of upkeep.

Their cost is particularly due to the fact that their construction requires staves that can be made only from boards taken from the most valuable parts of the oaks or chestnuts.

As a result, some users have thought of replacing them with receptacles of neutral, non-oxidizable material, such as stainless steel or plastics.

Particularly with receptacles made of neutral material, their ease of cleaning and the fact that they enable rapid, controlled temperature variation appeared to be advantageous.

Despite these advantages, such receptacles prove unsuitable for use over the entire course of vinification, because of the loss of the contact with the wood.

To overcome this disadvantage, some beverage makers use tanks made of neutral material, and then wooden barrels, in succession over the course of vinification.

Although this solution has made it possible to obtain fairly good results, it is still no less burdensome, because it only partially solves the problem.

To retain the interactions with the wood without having to use wooden receptacles or wood as valuable as that required for the staves, the idea of immersing wood in the grape juice has already occurred to those skilled in the art.

For example, wood in the form of chips has been immersed, either freely or contained in a narrow, juice-permeable bag.

One of the disadvantages of this method is that the exchange surface of the chips cannot be monitored precisely.

In fact, for two bags of equivalent weight, the effective surface area of the chips may vary considerably depending on their size.

Furthermore, the chips break down into dust and contaminate the wine.

In an attempt to overcome this disadvantage, it has already been thought of to use wooden inserts such as veneers or slats that have an exchange surface that is more easily monitored than that of chips; but then the problem arises of keeping these elements properly placed in each receptacle, in particular to keep them below the level of the juice despite the fact that wood floats, and to keep them from moving in front of the inspection flap and thereby hindering the passage of sensors or other devices through it.

To overcome that disadvantage, it is known (French Patent A 2.504.498) to use a wooden insert of a size just slightly less than the volume of the container, which includes a certain number of elongated elements that before being inserted into the receptacle are assembled to form a compartmented structure, in which the sides of the compartments are accessible to the liquid in which the insert is immersed.

The disadvantage of this insert is that in order to introduce it into the container, the wall of the receptacle must be provided with an opening that has a cross section adapted to at least one of the cross sections of the insert, and hence is very large.

The problem then arises of the tightness of the plug, especially when it has to close the aforementioned cutout in a removable fashion.

Clearly, this insert cannot simply be enclosed at the time the receptacle is manufactured, because the insert wears out and must be replaced after virtually every phase of vinification.

OBJECT AND SUMMARY OF THE INVENTION

One of the objects the invention seeks to attain is a method for contriving an insert including a set of elongated, substantially flat wooden elements in a receptacle that can be made in a receptacle having an opening of limited cross section, such as an inspection flap.

The method of the invention is characterized primarily in that the elongated elements are introduced into the receptacle one by one and that these elements are positioned in the receptacle in situ, with the aid of positioning means provided in this receptacle, and the elongated elements are joined in such a manner that they can be disassembled again.

The invention also relates to the means for performing the method and the receptacle provided with these means.

The invention will better understood from the ensuing detailed but non-limiting description, taken in conjunction with the accompanying drawings.

DESCRIPTION OF THE PREFERRED EMBODIMENT

Figures 1, 2:
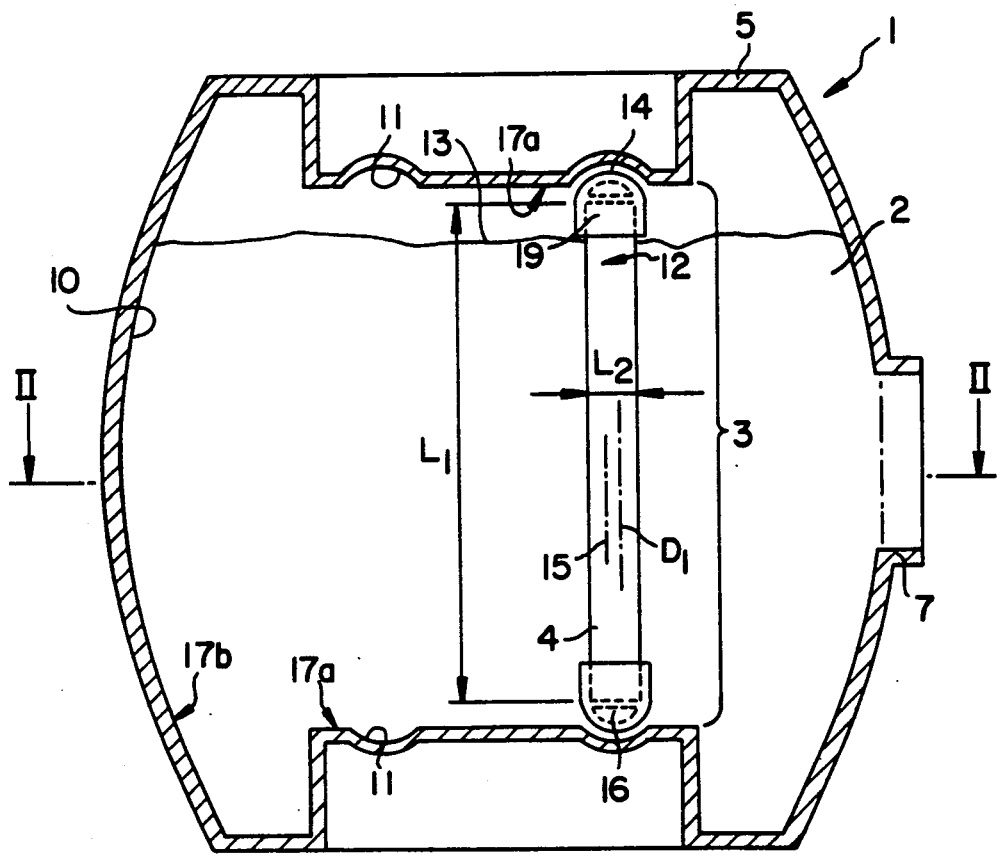
FIG. 1 is a sectional view along a longitudinal, generally vertical plane, of a receptacle equipped in accordance with the method of the invention.
FIG. 2 is a view taken along the line II—II of FIG. 1.
Figure 3:
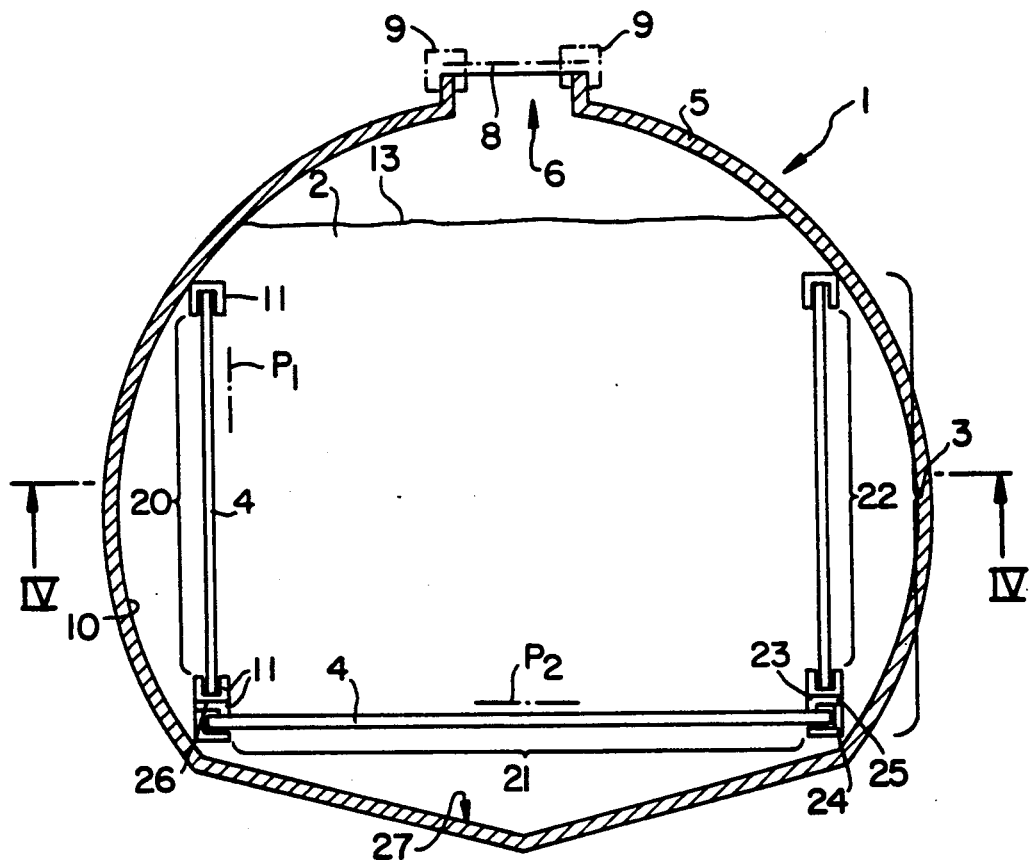
FIG. 3 is a sectional view along a transverse plane of a variant receptacle equipped in accordance with the invention.
Figure 4:
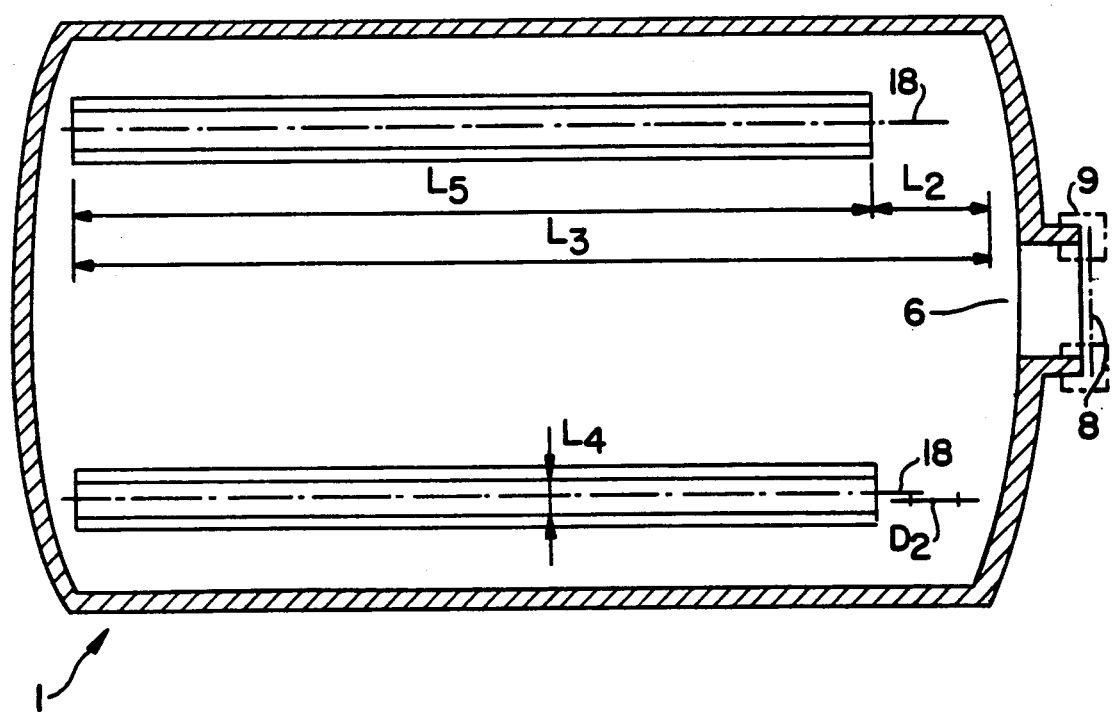
FIG. 4 is a view taken along the line IV—IV of FIG. 3.

Turning to the drawing, a receptacle 1 intended to contain a liquid 2 such as grape juice is seen.

As the drawing also shows, the receptacle accommodates an insert 3 including substantially flat, elongated wooden elements 4.

Each of these elements is understood to have a length L1, a certain width L2, and a certain thickness E, which can vary depending on the uses to which the element is put.

As shown here, the wall 5 of the receptacle includes at least one cutout 6 that forms an inspection opening of the receptacle; the cutout is also edged with a collar forming the seat 7 of a plug 8 affixed by any known means 9 provided for that purpose.

Preferably, during storage for fermentation of the contents, the receptacle 1 is installed in such a way that at least one such cutout 6 will be located in the upper portion of this receptacle, and moreover this cutout is closed with a plug 8 that has a certain permeability to gas, to permit an exchange between the contents and the atmosphere.

For example, in order to benefit from the requisite permeability, this plug 8, commonly known as a "bung", will be made of oak or chestnut.

To assure that this permeability will not be an obstacle to racking under pressure, for example with nitrogen, a tightly sealed plate, for example of sheet metal, may be disposed over the bung and can be affixed by the same means as those that assure the retention of the bung, such as a shackle.

Preferably, the wall of the receptacle is of neutral material, such as metal, and particularly stainless steel, or of plastic.

According to the invention, the elongated elements 4 are introduced into the receptacle one by one and with the aid of positioning means 11 provided in this receptacle are positioned in situ in the receptacle, and the elongated elements are joined in a manner capable of disassembly.

In a preferred embodiment, before each initial installation, at the level of the inside surface 10 of the wall 5 of the receptacle, at least two substantially opposed seats 11 are made, each one capable of accommodating one of the ends 12 of at least one elongated element, and then elements of suitable length L1 for the distance between the opposed seats are provided, and the ends of each element are engaged in the aforementioned facing seats 11, and each element is joined in a manner capable of disassembly.

The employment of this method makes it possible to use wooden slats 4 that cannot be used for making tanks and/or barrels, because they may have flaws (not shown), such as knots.

Constructing wooden receptacles in fact requires a draconian choice of the wooden slats used, and it is estimated that less than one-tenth of the volume of the tree trunks cut down is actually made use of.

Advantageously, the invention makes it possible to use wooden slats having structural imperfections.

Aside from its economic importance, the invention has considerable ecological importance, because it allows the preservation of trees.

In the same manner as was done when wooden tuns were used, the wooden slats can be subjected to heat treatment and more particularly to superficial carbonization before being put in place.

To this end, instead of using a traditional method such as burning the surface of the slats by direct contact with a flame, such as that of a blowtorch, which leads to defects in terms of uniformity of treatment and also partly destroys the tannin, the wooden slats are subjected for a predefined period of time to infrared radiation that is sufficiently lengthy and uniform to induce a homogeneous treatment over the entire surface of each slat.

To return to the description of the invention, it can be stated that at least one of the seats 11 will certainly be disposed below the presumed level 13 of liquid in the receptacle 1.

According to the invention, complementary seats 11, 14 that cooperate by interlocking in a privileged direction D1, D2 are provided respectively at the level of the surface 10 of the wall 5 of the receptacle and at the level of each end 12 of each elongated element 4.

In the invention, on the one hand, the complementary seats 11, 14 are designed to cooperate by interlocking in a direction D1 substantially parallel to the longitudinal axis 15 of each elongated element, and on the other, at least one elastic device 16 is disposed between at least one of the seats 11, 14 and its support, or in other words the wall 5 of the receptacle and/or one of the ends 12 of an element 4; this elastic device urges this seat 14 in its direction of interlocking with the complementary seat 11.

Preferably, when the receptacle is equivalent in volume to that used for shipping and marketing liquid, such as a barrel, tun or cask, but above all when its wall includes at least two opposed inside faces 17a that are substantially plane and circular, and in particular an internal face of revolution 17b, the seats 11 are made at the level of each of its opposed, substantially plane internal faces, by preferentially orienting the seats in a radiating disposition with respect to the center of each circular plane face.

In that case, the inspection opening 6 of the receptacle is cut out in the zone of the wall that carries the face of revolution, and its diameter is determined in proportion to the length of the elements to be engaged, as well as their width and the mean diameter of the receptacle.

On the one hand, at the level of the receptacle wall, each of the seats 11 comprises at least one curved surface of a mold made in the wall, and on the other, each seat 14 arranged at the level of each end 12 of an elongated element 4 comprises an elastically deformable stop 16 having a shape that is generally complementary to that of the receptacle 1; this stop also has at least one foot 19 that interlocks with the end 12 of the elongated element.

When the receptacle is relatively large in volume, for example when it is of the type including a man-sized inspection opening 6 and essentially a generally cylindrical wall for instance having a horizontal axis and a predetermined length L3, then the seats 11 are arranged on at least two generatrices 18 of the inside surface that are spaced apart by at least the value of the longitudinal dimension L1 of the elements 4.

According to the invention, the seats 11 made at the level of the receptacle wall are arranged such that with the elongated elements they form at least two internal walls 20-22, located in approximately perpendicular planes P1, P2.

In this case, at least some of the complementary seats 11, 14 are designed to cooperate by interlocking in a direction D2 substantially parallel to each generatrix 18 of the internal surface 10 of the wall 5 vertically of which they extend.

At least some of the seats 11 made at the level of the inside surface 10 of the receptacle comprise an angle profile of U-shaped cross section, on the one hand having a width L4 that is at least sufficient to seat an elongated element along its thickness E, and on the other hand having a length L5 at most equal to the length L3 of the generatrix 18 of the inside surface along which it is to extend, minus at least the width L2 of an elongated element 4.

Because of this particular technical feature, a passage is left between one of the ends of the profiles and the corresponding extreme face of the receptacle, and thus when they negotiate this passage the elongated elements can be successively engaged between the profiles.

According to the invention, at least two seats 11 made at the level of the wall 5 of the receptacle for receiving the ends 12 of elongated elements adjacent to the same corner between two walls 20-22 are associated with one another. One of them comprises two jaws 23, 24 articulated along an axis 25 substantially parallel to the generatrix 18 along which the seats 11 in question extend, and one (23) of these jaws 23, 24 is solidly attached to the other seat, which after the elements have been assembled tends to clasp the elongated elements 4 juxtaposed between the jaws 23, 24 by their thickness E.

To make this solid attachment, the jaw for instance presses on an outer face 26 of the other seat, such as the bottom of the U-shaped profile.

These technical features enable facilitating the assembly of at least one of the walls 20-22 of elongated elements in the receptacle, and more particularly the wall 21 of elements, and to make a floor above the bottom 27 of the receptacle.

As can be seen from the drawing, the bottom 27 of the receptacle may in fact comprise two converging planes forming a drainage chute, and the construction of a floor above this chute makes it easier later for a worker to move about in the receptacle as he works in it, for instance to assemble the other elements laterally.

Preferably, at least one of the jaws is equipped with a set of teeth.

The seats made at the level of the inside face of the receptacle, such as the profile sections and their optional jaws, are associated with the inside face of the receptacle by any known means.

One skilled in the art is equally capable of determining appropriate fastening means to use, and hence these means have not been shown.

What is claimed is:

1. A method of assembling on insert structure (3) having flat wooden elements (4) in a receptacle (1), the steps comprising:
   introducing elongated, flat wooden elements (4) one by one into the receptacle by way of an opening (6), each element having a length (L1) extending between two ends (12), width (L2) and thickness (E); and
   securing said elements to positioning means (11) within the receptacle, said positioning means holding said elements in place and allowing disassembly and removal of said elements through said opening one at a time.

2. The method of claim 1 wherein said positioning means are seats, each seat for accommodating one end of at least one element, said seats being in opposite pairs, and wherein said securing step includes placing each element between a corresponding opposing pair of seats with one end of said element secured to one seat of the opposing pair and the other end of said element secured to the other seat of the opposing pair.

3. The method of claim 2 wherein said seats are at the surface of a wall (5) of the receptacle.

4. The method of claim 3 wherein said receptacle has two opposed inside faces (17A) with said seats placed thereon and which are substantially planar and circular, and said securing step involves placing said elements in a circumferential pattern with their width (L2) extending in a radial direction with respect to each circular face.

5. The method of claim 3 wherein the receptacle has a generally cylindrical wall having a horizontal axis and a predetermined length (L3), said opening is a man-sized inspection opening, and the seats (11) are arranged on at least two generatrices (18) of the inside surface that are spaced apart by at least the value of the longitudinal dimension (L1) of the elements (4).

6. The method as defined by claim 3 wherein the seats (11) are arranged such that the securing step involves placing the elements to form at least two internal walls (20–22), located in approximately perpendicular planes (P1, P2).

7. A receptacle assembly comprising:
   a receptacle (1) having an opening (6) and a wall;
   a plurality of elongated, flat wooden elements (4) removably secured within said receptacle, each element having a length (L1) extending between two ends (12), width (L2),and thickness (E); and
   a plurality of seats disposed on an internal surface of said wall in opposing pairs with opposite ends of each element removably secured to opposing seats in a pair.

8. The receptacle assembly of claim 7 further comprising:
   at least one elastic device between at least one of said seats and one of said elements, said elastic device pressing said one of said elements towards a seat opposite said one of said seats and allowing removal of said one of said elements.

9. The receptacle assembly of claim 8 wherein at least some of the opposing seats secure elements in a direction (D2) substantially parallel to a generatrix (18) of an internal surface (10) of the wall (5) vertically of which they extend.

10. The receptacle assembly of claim 9 wherein at least some of the seats (11) have an angle profile of U-shaped cross section, a width (L4) that is at least sufficient to seat the thickness (E) of one of the elements, and a length (L5) at most equal to the length (L3) of the generatrix (18) of the internal surface along which the seat extends minus at least the width (L2) of an elongated element (4).

11. The receptacle assembly of claim 7 wherein at least two opposed seats (11) each include at least two jaws (23, 24) articulated along an axis (25) substantially parallel to a generatrix (18) of an internal surface of the receptacle along which the seats extend said jaws having a closed position to clasp the elements (4) juxtaposed between the jaws (23, 24) by the thickness of the elements (E), and at least one of these jaws (23, 24) has an outer face (26) with an angle profile of U-shaped cross section, oriented so that, in a closed position of said jaws and in combination with an opposed angle profile comprising a seat at the level of a generatrix (18) generally parallel to the aforementioned generatrix, said at least one angle profile holds elements, juxtaposed in a plane (P1) that is a secant to the plane (P1) defined by the elements, clasped by their thickness between the jaws.

* * * * *